(12) United States Patent
Dieckmann et al.

(10) Patent No.: US 8,973,972 B2
(45) Date of Patent: Mar. 10, 2015

(54) LATERAL REAR SPOILER DEVICE FOR A VEHICLE

(75) Inventors: Thomas Dieckmann, Pattensen (DE); Frank Zielke, Barsinghausen (DE)

(73) Assignee: WABCO GmbH, Hannover (DE)

(*) Notice: Subject to any disclaimer, the term of this patent is extended or adjusted under 35 U.S.C. 154(b) by 0 days.

(21) Appl. No.: 14/129,345

(22) PCT Filed: Apr. 4, 2012

(86) PCT No.: PCT/EP2012/001547
§ 371 (c)(1),
(2), (4) Date: Dec. 26, 2013

(87) PCT Pub. No.: WO2013/007323
PCT Pub. Date: Jan. 17, 2013

(65) Prior Publication Data
US 2014/0132031 A1   May 15, 2014

(30) Foreign Application Priority Data
Jul. 14, 2011 (DE) .......................... 10 2011 107 366

(51) Int. Cl.
*B62D 35/00* (2006.01)
(52) U.S. Cl.
CPC ............ *B62D 35/007* (2013.01); *B62D 35/001* (2013.01)
USPC ..................................................... 296/180.4
(58) Field of Classification Search
USPC .......................................... 296/180.4, 180.1
See application file for complete search history.

(56) References Cited

U.S. PATENT DOCUMENTS

| | | | | |
|---|---|---|---|---|
| 5,498,059 A | * | 3/1996 | Switlik | 296/180.1 |
| 2008/0048468 A1 | | 2/2008 | Holubar | |
| 2009/0179456 A1 | | 7/2009 | Holubar | |
| 2009/0295189 A1 | * | 12/2009 | Distel et al. | 296/180.1 |
| 2010/0201153 A1 | | 8/2010 | Pesotini, Jr. | |
| 2010/0225143 A1 | | 9/2010 | Skopic | |
| 2011/0148140 A1 | | 6/2011 | Benton | |
| 2012/0223544 A1 | | 9/2012 | Benton | |
| 2013/0076064 A1 | * | 3/2013 | Smith et al. | 296/180.1 |
| 2013/0106136 A1 | * | 5/2013 | Smith et al. | 296/180.4 |

FOREIGN PATENT DOCUMENTS

| | | |
|---|---|---|
| DE | 10 2008 036 888 A1 | 2/2010 |
| DE | 20 2009 015 009 U1 | 2/2010 |
| DE | 10 2009 014 860 A1 | 10/2010 |
| DE | 10 2009 034 517 A1 | 1/2011 |

OTHER PUBLICATIONS

Machine Translation of DE102008036888, printed from the EPO website Sep. 15, 2014.*

* cited by examiner

*Primary Examiner* — Jason S Morrow
(74) *Attorney, Agent, or Firm* — Kramer Levin Naftalis & Frankel LLP

(57) ABSTRACT

A rear spoiler device for a vehicle, such as a utility vehicle or a trailer, includes at least one adjustable air guiding element for aerodynamically guiding air and extending the contour of the lateral region of the rear of the vehicle. The guide element is adjustable between a travel position, in which it extends rearwards in a lateral region of the rear for aerodynamically guiding air and extending the contour, and a stowed position. The air guiding element is spring pre-loaded into the extended travel position and is adjusted into the stowed position by pressing the guide element from the rear side counter against the spring pre-load.

17 Claims, 3 Drawing Sheets

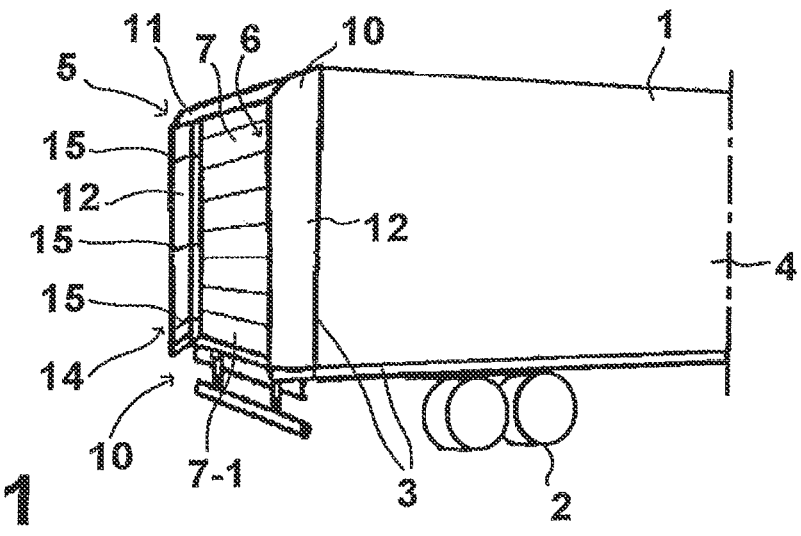
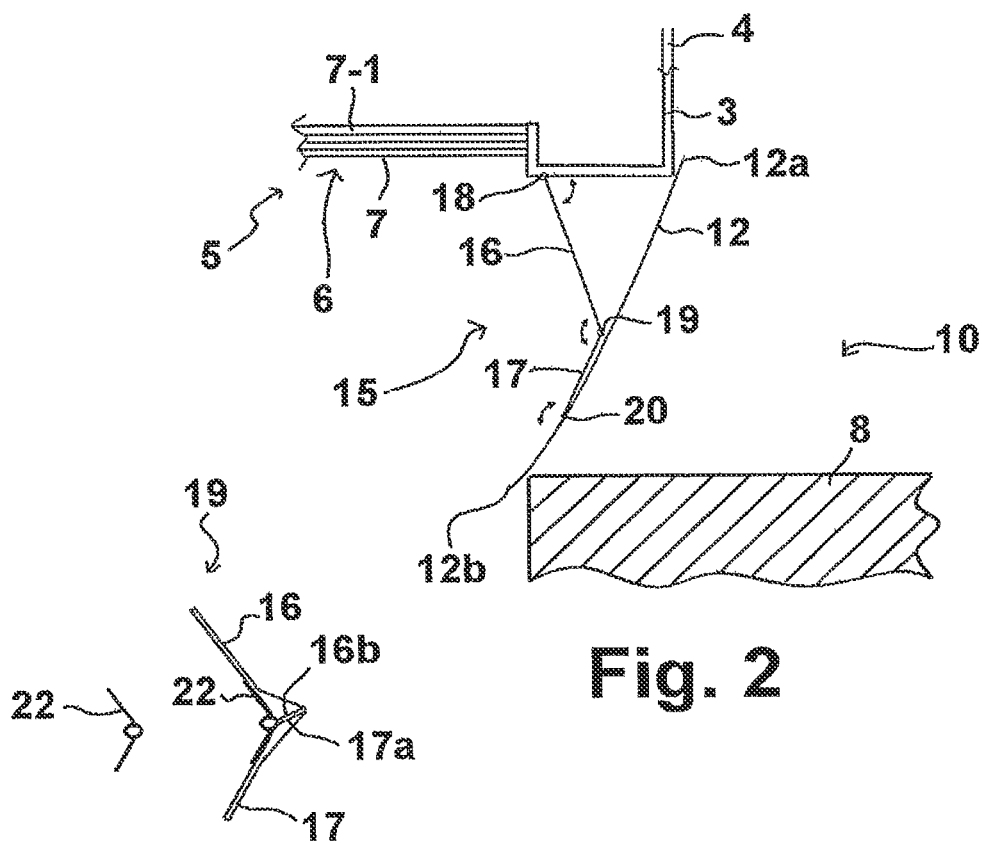

LATERAL REAR SPOILER DEVICE FOR A VEHICLE

FIELD OF THE INVENTION

The invention generally concerns a rear spoiler device for a vehicle, such as for a utility vehicle or a trailer.

BACKGROUND OF THE INVENTION

Utility vehicles such as heavy goods vehicles or buses, or trailers of heavy goods vehicles, generally have a box shape, which allows for effective use of available loading space and direct access to the loading space via the rear. During travel, however, the box shape leads to severe breakaway turbulence behind the rear of the vehicle and, hence, to poor aerodynamic properties. Rear spoilers serve to improve the aerodynamics of a vehicle and can reduce fuel consumption, accordingly.

For this, DE 10 2009 014 860 A1 proposes forming a rear spoiler for a utility vehicle on the sides and upper edge of the rear with several adjustable air guiding surfaces, which are substantially curved inward and adjustable separately in order to adapt automatically to the respective air flow during travel.

Some utility vehicles have attachments with an access opening at the rear, which is closed by a roller shutter. Such vehicles can generally be reversed up to a ramp without the driver first having to get out in order to open the roller shutter. With rear spoiler designs such as described in DE 10 2009 014 860 A1, reversing up to a ramp is problematic due to the air guide surfaces protruding at the rear.

SUMMARY OF THE INVENTION

Generally speaking, it is an object of the present invention to provide a rear spoiler device for a vehicle that permits easy access to the rear of the vehicle.

The present invention is based on the concept of allowing automatic movability of the lateral rear spoiler device by mechanical contact at, e.g., a docking station during a reversing approach or parking process. Here, movement is possible between a travel position, in which the air guiding element(s) form(s) the aerodynamically advantageous contour extension towards the rear, and a stowed position or unloading position with the air guiding element(s) lying fully or largely against the rear.

The stowed position serves for loading and unloading of the vehicle via the rear access opening, and is established on a reverse approach to an object.

Thus, the driver can reverse the vehicle up to a ramp or loading station so that, on contact with the ramp or loading station, the rear spoiler device moves or is retracted or folded in automatically without the driver needing to get out. This is advantageous in particular in the case of a vertically opening closure on the rear of the vehicle, e.g., a shutter door or a vertically liftable tarpaulin. Once at the ramp or loading station, the rear access door can be opened without interference from the rear spoiler device, the vehicle can be loaded and/or unloaded in the conventional manner, and then, after closing the rear access opening, the vehicle can be driven away, with the lateral rear spoiler device or the air guiding element(s) moving automatically into the travel position.

A center rear spoiler device can be arranged between lateral rear spoiler devices on the roof or upper edge of the rear, and, e.g., remain unchanged if it does not hinder the loading and unloading process.

Advantageously, in the retracted stowed position, the air guiding element(s) do(es) not protrude disruptively towards the middle, i.e., towards the rear access opening. For this, the rear spoiler device advantageously has a shift mechanism, preferably an articulated rod mechanism, which allows the movement of the air guiding element(s) between the stowed and travel positions, and, advantageously, also creates spring loading. The shift mechanism can guide the air guiding element(s) outwardly on folding, so that, in folded state, it/they do(es) not block the access opening to the rear.

Thus, longer air guiding elements, which allow more favorable aerodynamic properties, can also be used without blocking the access opening. Air guiding element length is not limited in principle according to the present invention.

The articulated rod mechanism can be formed by two rods, of which the first, front rod is hinged directly or indirectly to the vehicle frame or part of the vehicle frame, and the rear, second rod is hinged to the first rod and, in turn, holds an air guiding element. Advantageously, the two rods have different lengths; in the travel position, the first rod extends rearward and laterally outward, whereupon the second rod extends rearward and towards the middle. The first rod is preferably longer than the second rod, e.g., the length of the first rod is approximately equal to the sum of the lengths of the second rod and a region of the air guiding element between its connecting hinge on the second rod and its rear end.

Such an articulated rod mechanism can be achieved with relatively few components, e.g., only the first and second rods, and suitable stops to establish the travel position and the angular positions in the travel position, and corresponding springs. Advantageously, springs are provided in the three hinges to allow a dynamic shift between the different positions on a reversing approach. For this, e.g., the air guiding element can be swiveled on contact with the ramp and come into its relatively flat stowed position, and then the rods can be folded in. Here, the shift mechanism can be formed by several such articulated rod mechanisms, which can be provided vertically spaced between the frame and the air guiding element.

Because of the foldability, in particular on the rear hinge, the air guiding element can swivel when loaded by the contact. Its inwardly curved form here allows a relatively gentle roiling of the air guiding element on the ramp or resistance so that no extensive mechanical damage is expected, and even on harder impacts, a flexibility is achieved due to the multipiece hinge mechanism, in particular also the angles between the rods.

Production of the rear spoiler device is also favorable, e.g., in an embodiment with a larger air guiding element, made, for example, from plastic, reinforced plastic, or sheet metal, and an articulated rod mechanism of, e.g., rods and hinge inserts of springs and stop fittings, due to low material costs.

Still other objects and advantages of the present invention will in part be obvious and will in part be apparent from the specification.

The present invention accordingly comprises the features of construction, combination of elements, and arrangement of parts, all as exemplified in the constructions herein set forth, and the scope of the invention will be indicated in the claims.

BRIEF DESCRIPTION OF THE DRAWINGS

The invention is explained in greater detail below with reference to the accompanying drawings directed to one exemplary embodiment in which:

FIG. 1 depicts a vehicle with two rear spoiler devices according to an embodiment of the present invention;

FIG. 2 is a top view of the lateral rear region of the vehicle on approach to a ramp;

FIG. 3 shows a hinge structure from FIG. 2;

FIG. 9 depicts the lateral rear region in the retracted or folded stowed position for loading the vehicle.

DETAILED DESCRIPTION OF THE PREFERRED EMBODIMENTS

Figure 4:
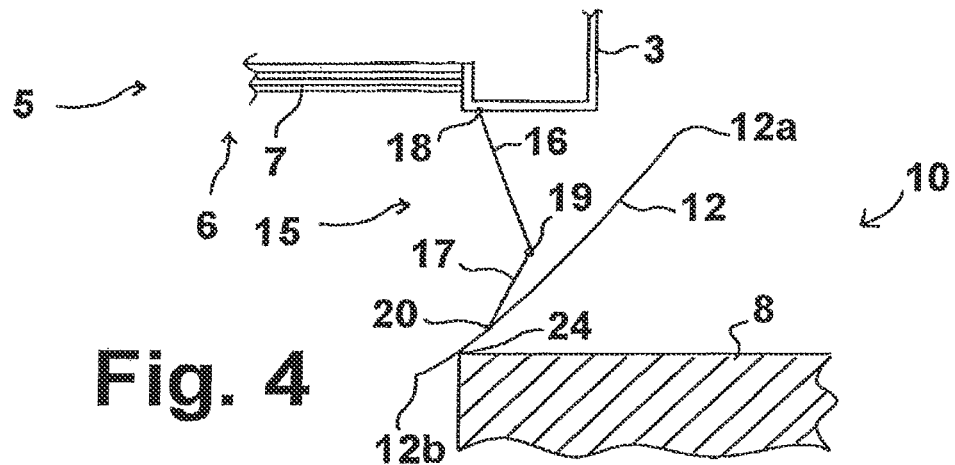
FIGS. 4-9 illustrate the folding or retraction process of the rear spoiler device according to FIG. 1 on approach to the ramp.

A utility vehicle 1 can, e.g., be a truck or a trailer (goods vehicle trailer). FIG. 1 shows the rear region of the utility vehicle 1 with wheels 2, a vehicle frame (superstructure) 3 and side wails 4. The side walls 4 can be solid, e.g., in a box trailer made of metal, or formed, e.g., by tarpaulins carried by the structural parts of the vehicle frame 3.

An access opening 6 for the loading space of the utility vehicle 1 is provided on the rear 5, and is closed by a roller shutter 7, which can be retracted vertically upwards. The roller shutter 7 consists of several elements 7-1 overlapping in the manner of slats. Thus, the access opening 6 of the utility vehicle 1 is not closed by rear doors swinging laterally rearwards. Instead of the roller shutter 7, another closure device can be provided that does not open towards the rear, in particular, a closure that opens vertically upwards or inwards such as, e.g., a retractable tarpaulin of flexible material. It is relevant that no swinging room to the rear is required in order to open the closure device 7.

The utility vehicle 1 can therefore reverse close to an unloading station, e.g., a ramp 8 shown in FIG. 2 or a seal to the ramp, for unloading, so that the driver or a user can then open the roller shutter 7 or the other closure device, e.g., manually or by electric operation.

Two lateral rear spoiler devices 10 are arranged in the rear region of the utility vehicle 1 and are fixed directly or indirectly to the vehicle frame 3. If the side walls 4 are formed rigidly and attached to the vehicle frame, fixing to the side walls 4 is also possible.

Each of the lateral rear spoiler devices 10 has an air guiding element 12, which in the extended or travel position (drive position) in FIGS. 1 and 2 extends the area of the side walls 4 towards the back and, thus, extends further to the back from the rear 5. The air guiding element 12 is, e.g., bent (curved) inward and, advantageously, extends over the entire height of the side walls 4; it can be made of lightweight material such as plastic or from sheet metal. The length of the air guiding element 12 towards the rear is in principle freely configurable and not limited. The aerodynamic curvature of the air guiding element 12 is known; in particular, a direct breakaway edge at the lateral rear region or at the transition of the side walls 4 to the rear 5 is avoided.

Figure 9:
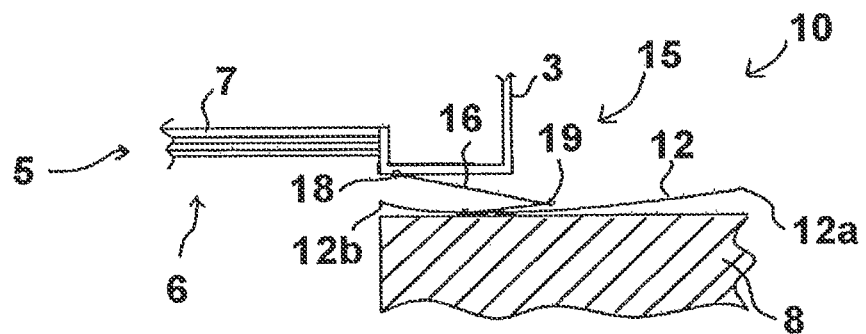

The rear spoiler devices 10 can be moved automatically between the travel position shown in FIGS. 1 and 2 and the stowed position shown in FIG. 9 by contact on a rear object, in particular, the ramp 8. For this, they are spring-preloaded in the travel position in FIGS. 1 and 2, as will be explained in more detail below.

Between the two lateral rear spoiler devices 10, in the upper region of the rear 5. e.g., an upper middle rear spoiler device 11 can be provided, which is preferably not moved. The upper middle rear spoiler device, here, shown in the travel position, transforms substantially, for example, into the lateral rear spoiler devices 10 in order to form a rear spoiler arrangement that is closed at both sides and at the top.

Each of the rear spoiler devices 10 can have, in addition to the air guiding element 12, a shift mechanism 14, which guarantees the movability and elastic preload of the air guiding element 12 in relation to the rear 5. According to the embodiment shown, the shift mechanism 14 is formed by three vertically spaced, articulated rod mechanisms 15. In FIG. 1, this formation is shown on the left rear spoiler device 10, Each articulated rod mechanism 15 has two rods (braces) 16, 17 and three hinges 18, 19, 20.

The first rod 16 is attached to the rear 5 at the first hinge 18, preferably, to the vehicle frame 3 or the end of the side wall 5. Thus, the first hinge 18 serves also as a fixing device for the entire rear spoiler device 10 on the rear 5 or the vehicle frame 3 in the region of the rear 5. The second hinge 19 connects the rods 16 and 17, of which the second rod 17 is shorter than the first rod 16, e.g., half as long or even shorter. The third hinge 20 connects the air guiding element 12 with the second rod 17. The hinges 18, 19, 20, as indicated by arrows in FIG. 2, are preloaded in the opened spring position shown. The spring force consequently acts along the arrow direction to enlarge the angle. Thus, the first rod 16 is pressed rearward away from the side wail or rear, the second rod 17 is pressed into a rearward pointing position and the air guiding element 12 is, in turn, preloaded by springs, such that with its front end 12a, it terminates approximately flush or level with the side wall 4. As shown, the air guiding element 12 can protrude slightly laterally so that it lies on the side wall 4 under spring preload. The rear end 12b of the air guiding element 12 protrudes freely to the rear.

The hinges 18, 19, 20 furthermore have stops so that the angular positions shown in FIGS. 1 and 2 are maintained. The stops can be formed by additional components or by the configuration of the rods 16, 17 themselves. FIG. 3 shows such an arrangement as an example for the hinge 19, which can be transferred accordingly to hinges 18 and 20. The hinge 19—also shown alone on the left—has a spring for opening the angle between the rods 16 and 17. The spring 22 is, preferably, formed as a leg spring, here with two legs, wherein, due to the spring effect of the spring 22, the stops 36b and 17a of rods 16 and 17 are pressed against each other. These stops 16b and 17a can be parts of the rods 16 or 17 or additional components attached to the rods 16, 17, together with the spring 22 as a hinge 19.

Thus, a stop on the vehicle frame 3 is provided at the hinge 18; correspondingly at hinge 20 there is a stop on the air guiding element 12, or the frame 3 and the air guiding element 12 themselves serve as a corresponding stop.

The hinges 18, 19, 20 are thus preloaded in the travel position shown in FIGS. 1 and 2 and defined by stops.

As evident, e.g., from the view in FIG. 2, an angle of less than 180° to the inside or to the center line of the vehicle is formed between the rods 16 and 17. The hinge 19 also lies laterally further out than the hinge 20, and the hinge 20 lies laterally further out than the front end 12b of the air guiding element 12. This ensures that, on contact, and, hence, on pressure loading on the end 12b of the air guiding element 12, the folding process described according to FIGS. 3 to 9 below can take place automatically, When the utility vehicle 1 reverses up to the ramp 8, the air guiding element 12 with its end 12b or an end region makes contact with the ramp 8, which here, e.g., has a rubber buffer surrounding it on three sides in the usual manner. According to FIG. 4, the contact point 24 is generally formed between the end 12b and the hinge 20, i.e., on the outside of the air guiding element 12. The ramp 8 thus exerts a forward-acting force F on the air guiding element 12 at the contact point 24, wherein this contact point 24 can then generally change since, according to FIGS. 4 to 9, the air guiding element 12 swivels in and thus brings its curved outside into different contact points against the spoiler 8. The force F with the corresponding lever arm therefore exerts a torque on the hinges 20, 19, 18, which acts against the spring effect of the respective springs 22.

The further folding process takes place depending on the resulting lever arms and spring strengths of the three springs 22 of the hinges 18, 19 and 20. The hinge mechanism 15 here folds in so that the angles between the rod 16 and the frame 3, and between the two rods 16 and 17, become smaller and hence the hinge 20 in which the air guiding element 12 is held comes closer to the frame 3. The air guiding element 12 can roll or slide slightly on the ramp 8, so that the angle between the rod 17 and the air guiding element 12 can, e.g., initially become larger, as evident from FIGS. 4, 5 and 6, and then reduce again on further reversing according to FIGS. 7, 8 and 9.

Figure 5:
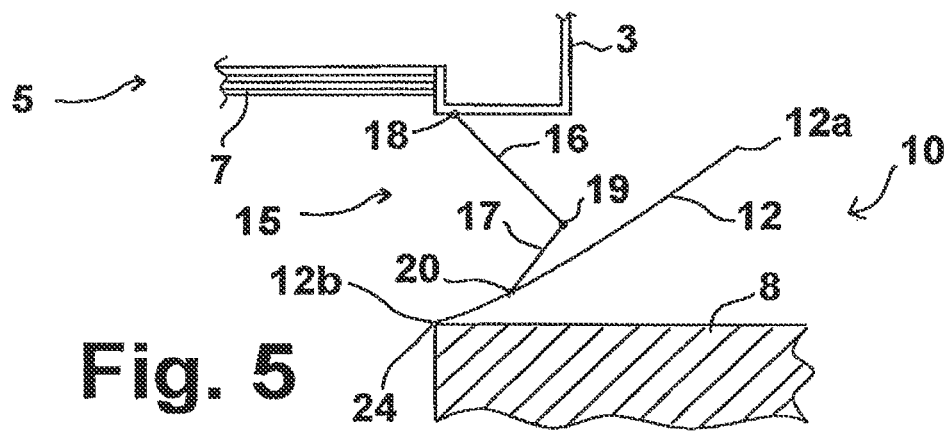
Figure 6:
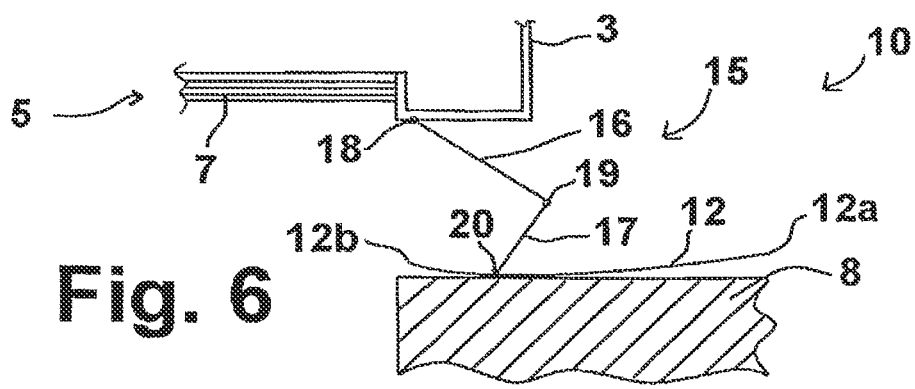
Figure 7:
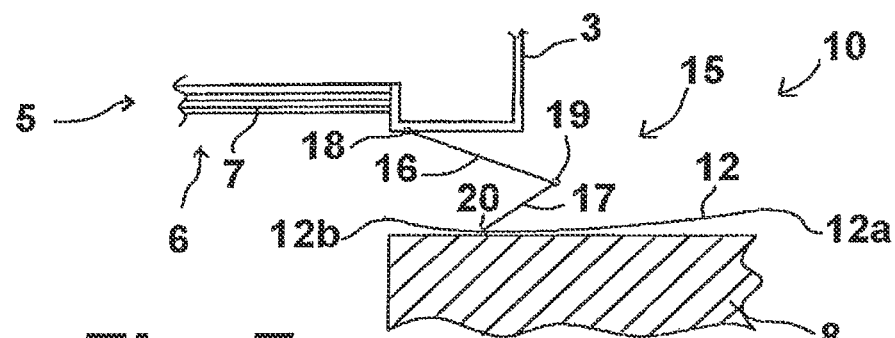
Figure 8:
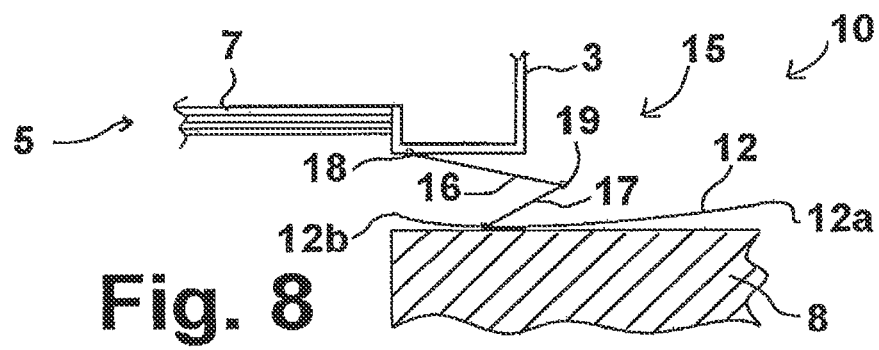

For this, the spring strength of the hinge 20 is, e.g., designed slightly weaker than the spring strengths of hinges 18 and 19, where applicable, taking into account the lever arms, so that, on reversing approach according to FIGS. 4, 5, 6, first the air guiding element 12 comes to rest against the ramp 8 and the contact point 24 lies, e.g., substantially close to the hinge 20. Then, the rods 16, 17 fold in further, in the folded state, i.e., in the stowed position in FIG. 9, the air guiding element 12 with its rear end 12b now extends laterally approximately as far as the frame 3 or the hinge 18, so that the air guiding element 12b does not hinder or significantly restrict access to the access opening 6 after the raising of the roller shutter 7. Thus, the length of the first rod 16 substantially corresponds to the sum of the lengths of the second rod 17 and the portion of the air guiding element 12 between the hinge 20 and its end 12b, as evident from FIG. 9.

If the automatic folding process is hindered or problematical because of the configuration of the ramp 8, this folding process can also be initiated manually by a user, by pressing in the air guiding element 12 in the region of its front end 12b.

In principle, a lock for the rear spoiler device 10 in the stowed position in FIG. 9 can be provided. If the rear spoiler device 10 is pressed in by hand, it can therefore be fixed by such a lock. The lock can, e.g., be formed by an additional rod between the hinges 18 and 20. In principle, however, such a lock is not required.

The air guiding element 12 can also be multipiece, i.e., divided into horizontal sections, so that each of the parts is carried by a corresponding rod mechanism 15. The one-piece design is, however, advantageous so that, on reversing approach to the ramp 18, the entire air guiding element 12 is folded in with only one contact point 24.

After loading the utility vehicle 1, the roller shutter 7 can be closed again and the utility vehicle 1 can drive ahead so that the rear spoiler device 10 automatically unfolds again according to the process in FIG. 9, back to the travel position of FIGS. 1 and 2.

Instead of the articulated rod mechanism 15 of two rods 16 and 18, the air guiding element 12 can, e.g., be made of super-elastic material with suitable forming, i.e., a substantially curved development corresponding to the rods 16, 17. The hinges 18 and 20 can therefore be omitted.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover ail of the generic and specific features of the invention herein described and all statements of the scope of the invention that, as a matter of language, might be said to fall therebetween.

What is claimed is:

1. A rear spoiler device for a vehicle, the rear spoiler device comprising: at least one air guiding element movable between a travel position, in which the at least one air guiding element extends toward the rear of the vehicle for aerodynamic air guidance and contour extension of a lateral region of the rear of the vehicle, and a stowed position, the at least one air guiding element being spring preloaded in the travel position and movable to the stowed position by moving the at least one air guiding element against spring tension, the at least one air guiding element being disposed on at least one articulated rod mechanism having at least two rods connected to one another at respective ends, a spring mechanism being disposed proximate the connecting ends to preload the rods in different directions.

2. The rear spoiler device as claimed in claim 1, further comprising a fixing device configured to affix the rear spoiler device to the rear of the vehicle.

3. The rear spoiler device as claimed in claim 2, wherein the at least one air guiding element protrudes laterally outward beyond a side wall of the vehicle when the at least one air guiding element is in the stowed position.

4. The rear spoiler device as claimed in claim 1, wherein a front end of the at least one air guiding element is swivalable toward the rear of the vehicle and outward from the vehicle when the at least one air guiding element moves into the stowed position.

5. The rear spoiler device as claimed in claim 1, wherein the at least one air guiding element extends substantially parallel to the rear of the vehicle when the at least one air guiding element is in the stowed position.

6. The rear spoiler device as claimed in claim 1, wherein the at least one air guiding element is disposed on the at least one articulated rod mechanism without direct connection to the vehicle, and a front end and a rear end of the at least one air guiding element are movable in relation to the vehicle.

7. The rear spoiler device as claimed in claim 6, wherein the at least one articulated rod mechanism comprises at least two articulated rod mechanisms, and wherein rods of each of the at least two articulated rod mechanisms are spaced from rods of other articulated rod mechanisms.

8. A rear spoiler device for a vehicle, the rear spoiler device comprising: at least one air guiding element movable between a travel position, in which the at least one air guiding element extends toward the rear of the vehicle for aerodynamic air guidance and contour extension of a lateral region of the rear of the vehicle, and a stowed position, the at least one air guiding element being spring preloaded in the travel position and movable to the stowed position by moving the at least one air guiding element against spring tension, wherein the at least one air guiding element is disposed on a shift mechanism without direct connection to the vehicle, and a front end and a rear end of the at least one air guiding element are movable in relation to the vehicle, wherein the shift mechanism includes at least one vertically spaced articulated rod mechanism, wherein the at least one articulated rod mechanism includes a first rod and a second rod, the first rod being longer than the second rod, the first rod being mountable by a first hinge one of directly and indirectly on the vehicle, and, in the travel position, extending from the first hinge rearward and laterally outward, the second rod being hinged by a second hinge on the first rod and, in the travel position, extending from the second hinge rearward, and wherein the at least one air guiding element is hinged by a third hinge on the second rod.

9. The rear spoiler device as claimed in claim 8, wherein the third hinge is disposed between the front and rear ends of the at least one air guiding element closer to the rear end of the at least one air guiding element.

10. The rear spoiler device as claimed in claim 9, wherein the spring mechanism is disposed one of in the first, second and third hinges and as part of the first, second and third hinges to form the spring tension.

11. The rear spoiler device as claimed in claim 8, further comprising stops configured to establish a defined angular position of the first and second rods and of the at least one air guiding element in the travel position, and wherein the first and second rods and the at least one air guiding element are preloaded in the angular position of the travel position.

12. The rear spoiler device as claimed in claim 11, wherein the stops are formed at least one of as parts of the first and second rods and as a unit together with the spring mechanism.

13. The rear spoiler device as claimed in claim 8, wherein a length of the first rod corresponds approximately to a sum of a length of the second rod and a rear portion of the at least one air guiding element between the rear end and the third hinge.

14. A vehicle, comprising: an access opening at a rear of the vehicle, the access opening being closable by a vertically movable closure device; and two rear spoiler devices, the rear spoiler devices comprising at least one air guiding element movable between a travel position, in which the at least one air guiding element extends toward the rear of the vehicle for aerodynamic air guidance and contour extension of a lateral region of the rear of the vehicle, and a stowed position, the at least one air guiding element being spring preloaded in the travel position and movable to the stowed position by moving the at least one air guiding element against spring tension, wherein the rear spoiler devices are movable from the travel position into the stowed position by reversing the vehicle up to an object at the rear of the vehicle, and wherein, in the stowed position, the rear spoiler devices do not substantially cover the access opening.

15. The vehicle as claimed in claim 14, wherein the two spoiler devices include one left rear spoiler device having one left air guiding element, and one right rear spoiler device having one right air guiding element, wherein the left and right air guiding elements each extend from a top of the rear of the vehicle to a bottom of the rear of the vehicle.

16. The rear spoiler device as claimed in claim 2, wherein the fixing device is affixed to a portion of the vehicle frame at the rear of the vehicle.

17. The rear spoiler device as claimed in claim 3, wherein the at least one air guiding element extends approximately as far as the fixing device when the at least one air guiding element is in the stowed position.

\* \* \* \* \*